United States Patent
Martin et al.

(10) Patent No.: US 9,124,128 B2
(45) Date of Patent: *Sep. 1, 2015

(54) ARRANGEMENT FOR AN UNINTERRUPTIBLE POWER SUPPLY

(75) Inventors: Xavier Martin, Warstein (DE); Hendrik Noack, Schoenborn (DE); Detlef Winkler, Soest (DE)

(73) Assignee: AEG Power Solutions B.V., Zwanenburg (NL)

( * ) Notice: Subject to any disclaimer, the term of this patent is extended or adjusted under 35 U.S.C. 154(b) by 601 days.

This patent is subject to a terminal disclaimer.

(21) Appl. No.: 13/439,669

(22) Filed: Apr. 4, 2012

(65) Prior Publication Data
US 2013/0140898 A1    Jun. 6, 2013

(30) Foreign Application Priority Data
Dec. 1, 2011    (EP) .................................... 11191479

(51) Int. Cl.
*H02J 7/00*    (2006.01)
*H02J 9/06*    (2006.01)
*H02M 5/458*    (2006.01)
*H02J 3/00*    (2006.01)

(52) U.S. Cl.
CPC ............ *H02J 9/062* (2013.01); *H02M 5/4585* (2013.01); *H02J 3/006* (2013.01); *Y10T 307/615* (2015.04)

(58) Field of Classification Search
CPC .................................. H02J 9/06; H02J 9/062
USPC ..................................................... 307/64–66
See application file for complete search history.

(56) References Cited

U.S. PATENT DOCUMENTS

| 6,201,319 | B1 | 3/2001 | Simonelli et al. |
| 6,691,248 | B1* | 2/2004 | Nishijima et al. .............. 714/14 |
| 7,432,615 | B2* | 10/2008 | Hjort ............................. 307/64 |
| 2005/0278075 | A1 | 12/2005 | Rasmussen et al. |

(Continued)

FOREIGN PATENT DOCUMENTS

| JP | 9037488 A | 2/1997 |
| JP | 2006042530 A | 2/2006 |

(Continued)

OTHER PUBLICATIONS

European Search Report for related European Application No. 11191479.2 dated Nov. 15, 2012.

(Continued)

*Primary Examiner* — Jared Fureman
*Assistant Examiner* — Alfonso Perez Borroto
(74) *Attorney, Agent, or Firm* — Cohen & Hildebrand, PLLC

(57) ABSTRACT

The invention relates to an arrangement for an uninterruptible power supply with a rectifier, an energy store, an inverter, a switching means and a controller. The rectifier is connected to a rectifier input to a supply grid (AC1). The energy store is connected to a rectifier output of the rectifier (1) and to an inverter input of the inverter. A network (AC3) to be protected or a load to be protected is connected to an inverter output of the inverter, wherein the rectifier input or a supply grid (AC2) is connected via the switching means to the inverter output, and wherein the rectifier, the inverter and the switching means is controlled by the controller, wherein the controller has two control parts which are constructed with redundancy, and wherein the rectifier and the switching means or the inverter and the switching means can be controlled simultaneously by the control parts.

15 Claims, 1 Drawing Sheet

(56) References Cited

U.S. PATENT DOCUMENTS

Figure 1:
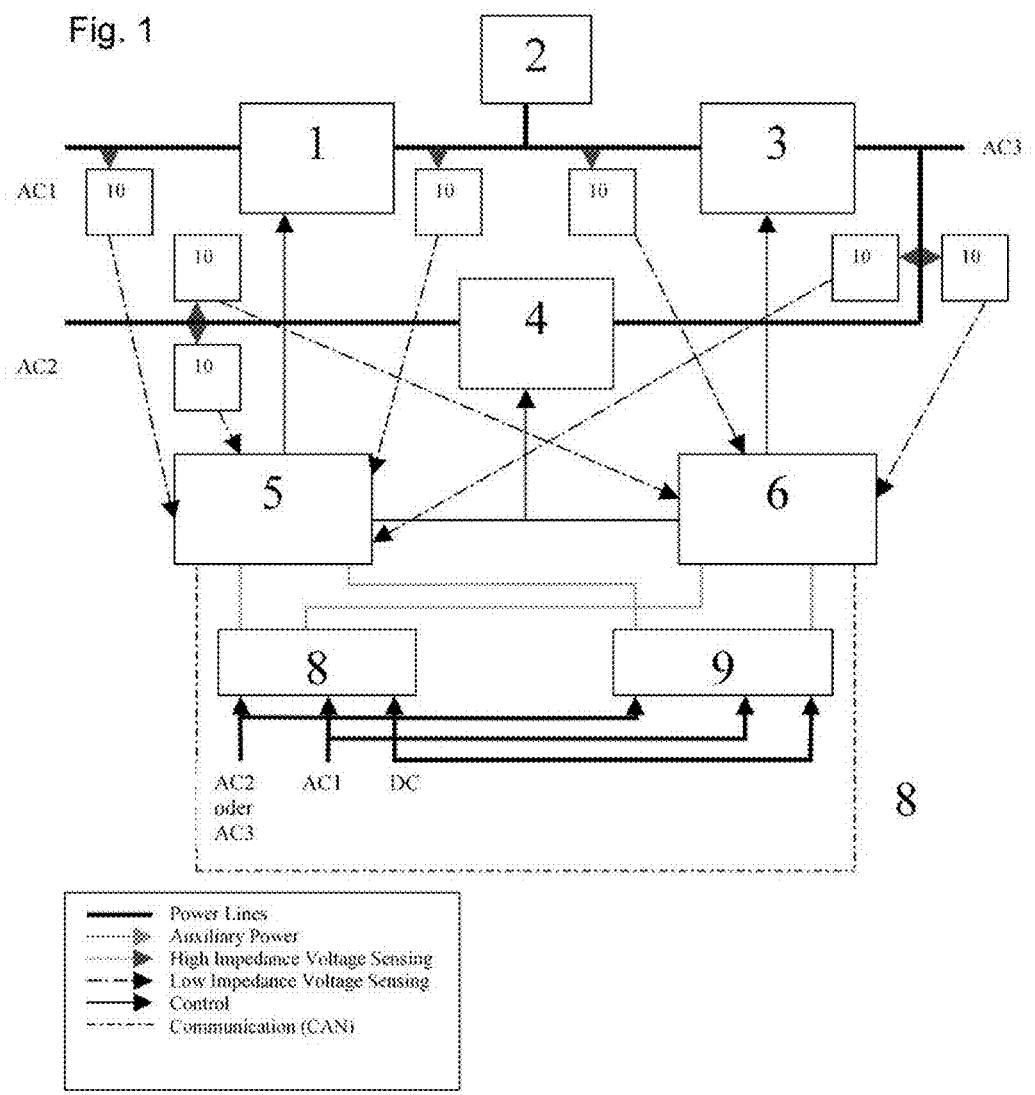

| | | |
|---|---|---|
| 2006/0226706 A1* | 10/2006 | Edelen et al. .................. 307/64 |
| 2008/0265680 A1 | 10/2008 | Marwali et al. |
| 2011/0133560 A1 | 6/2011 | Yamashita et al. |

FOREIGN PATENT DOCUMENTS

| | | | |
|---|---|---|---|
| JP | 2008295298 A | * | 12/2008 |
| WO | 2010037708 | | 4/2010 |

OTHER PUBLICATIONS

Co-owned, copending U.S. Appl. No. 13/404,323, filed Feb. 24, 2012.

Co-owned, copending U.S. Appl. No. 13/438,965, filed Apr. 4, 2012.

* cited by examiner

ARRANGEMENT FOR AN UNINTERRUPTIBLE POWER SUPPLY

BACKGROUND OF THE INVENTION (1) Field of the Invention

The present invention relates to an arrangement for an uninterruptible power supply with a rectifier, an energy store for storing electrical energy, an inverter, a switching means, and a controller. A rectifier input of the rectifier can be connected to a supply grid. The energy store is connected to a rectifier output of the rectifier and to an inverter input of the inverter. A network to be protected or a load to be protected can be connected to an inverter output. The rectifier input or the supply grid can be connected via the switching means to the inverter output, and the rectifier, the inverter and the switching means can be controlled by the controller.

(2) Description of Related Art

Various arrangements for an uninterruptible power supply, abbreviated as UPS, are known in the art. A differentiation is made between the type of an offline UPS and the type of an online UPS.

When the supply grid is undisturbed, a UPS in offline operation, also referred to as voltage and frequency dependent UPS (VFD-UPS) or passive UPS, conducts the current directly from the supply grid via the closed switching means to the network to be protected or the load to be protected. The rectifier charging the electrical energy store is also supplied from the input. When the supply from the grid is interrupted, the switching means switch over to connect the output of the inverter, which is supplied from the rectifier or the energy store, with the network to be protected or the load to be protected.

When a UPS operates online, also referred to as voltage and frequency independent UPS (VFI-UPS), continuously operating UPS, dual converter UPS and the like, the supply grid is connected to the input of the rectifier charging the energy store. The network to be protected or the load to be protected are supplied from the inverter, wherein the inverter receives the required energy from the rectifier when the supply grid is undisturbed, meaning that the grid voltage is present at the rectifier input, and is supplied from the energy store in the event of a grid failure.

The AC voltage at the inverter output is generated by the inverter from the DC voltage of the so-called DC link circuit between the rectifier and the inverter.

For enhancing the security of supply with a VFI-UPS, the switching means which connects the supply grid via by the rectifier and the inverter with the network to be protected and/or the load to be protected, when the rectifier and the inverter operate undisturbed, enables a so-called bypass circuit, which connects the supply grid and the network to be protected or the load to be protected via the switching means by bypassing the rectifier and the inverter. When a fault occurs in the rectifier or inverter, the connected load is switched over to this bypass and supplied with power without interruption.

The topology of an offline UPS and an online UPS may be identical. They can mainly be distinguished by the different position and task of the switching means. With a suitable layout of the components of a UPS and a suitable control, an offline UPS can hence be converted into an online UPS and vice a versa.

In an online UPS manufactured and distributed by the applicant, the controller includes three control parts which are connected via a CAN-BUS, wherein one control part is provided for controlling the rectifier, one control part for controlling the inverter, and one control part for controlling the switching means. Each control part has an integrated dedicated auxiliary current supply for supplying the control part with auxiliary current. If a control part or an auxiliary current supply powering the control part fails, then this control part is unable to contribute supplying the grids or loads connected to the UPS.

Moreover, sensors for measuring different electrical parameters at the input and/or the output of the rectifier or of the inverter or at other locations of the UPS are integrated in each control part. To this end, each control part is connected to the measurement locations via measuring lines. Sometimes, high voltages may be present at the measuring lines which may be exposed to disturbance sources, which may cause faulty measurement results unless adequate measures are taken to prevent a disturbance of the measurement.

It is therefore the object of the invention to improve an arrangement for an uninterruptible power supply of the aforedescribed type so as to increase the reliability and reduce the susceptibility to disturbances. In particular, the susceptibility of the measurement of electrical parameters to disturbances should also be reduced.

BRIEF SUMMARY OF THE INVENTION

This object is attained with the control having two control parts, which are constructed with redundancy at least regarding the switching means, and by allowing control of the rectifier and the switching means by a first of the control parts and simultaneously allowing control of the inverter and the switching means by a second of the control parts. Alternatively, one of the control parts or both control parts may be constructed with redundancy regarding the rectifier and/or the inverter, so that the rectifier, the inverter and the switching means can be controlled simultaneously with the control part which is redundant with respect to the rectifier and the inverter.

In an arrangement according to the invention, which is different from the state-of-the-art, not three control parts are provided, but only two. The control parts are also designed so that at least the switching means can be controlled by each of the control parts, and optionally the rectifier, the inverter and the switching means can also be controlled by one of the control parts or by each of the control parts. Essentially, a single control part may be sufficient for operating the arrangement. With the redundancy provided by the invention, a higher lever of reliability is attained, although compared to the state-of-the-art the number of control parts is reduced.

Advantageously, the control parts are formed by identically constructed circuit arrangements, even if the control parts are not provided to control the inverter, the rectifier or the switching means. It can thereby be ensured that both control parts can assume the control of at least the switching means and optionally of the inverter, rectifier and the switching means. In addition, the manufacture of the arrangement is simplified by using identical circuit arrangements.

The control parts may be programmed, whereby programming of the control parts may be different in that, when the first control part is undisturbed, at least the rectifier can be controlled by the first control part of the two control parts, and that, when the second control part is undisturbed, at least the inverter can be controlled by the second control part of the two control parts. The rectifier or the inverter can be associated with each control part with suitable programming, wherein the control part controls the associated component when the controller is operates undisturbed. In addition, the switching means and/or the other component may also be associated with the control part when, for example, the other control part fails.

By associating the rectifier with the first control part and the inverter with the second control part, when the controller is undisturbed, it can be ensured, when the controller is undisturbed, that the control parts are not fully loaded, in particular thermally loaded, which increases the service life of the circuit components.

When the first control part is disturbed, the inverter and the switching means and optionally the rectifier may be controlled by the second control part, and when the second control part is disturbed, the rectifier and the switching means and optionally the inverter may be controlled by the first control part.

A circuit arrangement according to the invention may have at least two means for supplying auxiliary current, wherein each means for providing auxiliary current is connected to an input of the first control part for receiving the auxiliary current and with an input of the second control part for receiving the auxiliary current, thereby supplying electrical energy to the control parts.

A circuit arrangement according to the invention may have at least two means for supplying auxiliary current, namely a first and a second means for supplying auxiliary current, with each means having two outputs. An auxiliary voltage may be tapped at the outputs. A first of the two outputs of the first and the second means for supplying auxiliary current may be connected to an input of the first control part for receiving auxiliary current and a second of the two outputs of the first and the second means may be connected to an input of the second control part for receiving auxiliary current.

The two outputs of the means for supplying auxiliary current are preferably decoupled from one another such that when one output is disturbed, for example by a short-circuit, the other output of the same means for supplying auxiliary current remains unaffected. In addition, the two inputs of the control parts are preferably also decoupled such that a disturbance at one input for supplying auxiliary current does not affect the other input of the same control part.

A circuit arrangement according to the invention may alternatively have at least two means for supplying auxiliary current, each having one output supplying an auxiliary voltage, wherein each output of a means for supplying auxiliary current is connected to an input of the first control part for receiving auxiliary current and with an input of the second control part.

Unlike in conventional arrangements, several means for supplying auxiliary current which are separate from the controller are provided. The means for supplying auxiliary current are, unlike in the state-of-the-art, also no longer associated with a specific control part and are not integral parts of the control parts. The control parts of the invention are therefore also not exposed to a comparatively high voltage which is present at an input of the auxiliary current supply and which is also present on the control part in conventional control parts with an integral auxiliary current supply. Instead, each means for supplying auxiliary current is able to supply auxiliary energy to the first control part and/or the second control part. The auxiliary current supply is hence also configured with redundancy. Advantageously, when the auxiliary current supply is undisturbed, both means for producing auxiliary current are operated so as to supply only half the required power, which reduces the load on the means for supplying auxiliary power, in particular the thermal load, and hence results in a longer service life of the means for supplying auxiliary current.

Advantageously, the means for supplying auxiliary current are identically constructed circuit arrangements, thereby significantly simplifying the manufacture of the arrangement of the invention.

Each means for supplying auxiliary current may have a first input, a second input and a third input, and optionally a fourth input. The means may be connected via these inputs to the rectifier input, the inverter output, the energy store or the input of the switching means. Auxiliary current may be supplied to the means for supplying auxiliary current via each of the three or four inputs.

An arrangement according to the invention may include sensors for measuring voltages and/or currents, wherein each sensor may be connected by way of a sensor output of the sensor with exactly one control part and wherein each sensor can convert a parameter to be measured into a low-voltage signal, in particular a safe-extra-low-voltage level, which can be supplied to the control part via a line connecting the sensor and the control part.

At least a portion of the sensors may be arranged in pairs, wherein the sensors of a sensor pair may be connected to contacts or wires of the arrangement for measuring the same electrical parameter, and wherein one sensor of a sensor pair may be connected to the first control part and the other sensor of a sensor pair to the second control part.

With the sensors, the voltage may be measured at the rectifier input, at the rectifier output, at the energy store, at the inverter input, at the inverter output, at the side of the switching means facing the supply grid and/or at the side of the switching means facing the network to be protected or the load to be protected. The measurement signals may be used in the control parts for controlling the rectifier, the inverter and/or the switching means.

The sensors may be formed from identically constructed circuit arrangements.

The control parts are preferably connected to one another by a communication bus, for example a CAN bus.

BRIEF DESCRIPTION OF THE SEVERAL VIEWS OF THE DRAWING(S)

Additional features and advantages of the invention will now be described with reference to the following description of an exemplary embodiment, which shows in:

FIG. 1 a schematic diagram of an online UPS according to the invention.

DETAILED DESCRIPTION OF THE INVENTION

The UPS according to the invention is illustrated in FIG. 1 in a single-pole representation, i.e. only a phase conductor of the UPS is shown, but not a neutral conductor of the UPS. The DC voltages are also not shown in a two-pole representation.

The UPS according to the invention includes a rectifier 1, an energy store 2, an inverter 3, and a switching means 4. An input of the rectifier 1 is connected to a supply grid AC1. An output of the rectifier 1 is connected, on one hand, to the energy store 2 and, on the other hand, to an input of the inverter 3. An output of the inverter 3 is connected to a network AC3 to be protected. The input of the switching means is connected to a supply grid AC2 and the output of the switching means is connected to the network AC3 to be protected.

Depending on the switch position, the switching means 4 can connect the supply grid AC2 with the network AC3 to be protected. When the rectifier 1 and the inverter 3 operate undisturbed and when the supply grid AC1 is also undisturbed, the network AC3 to be protected is supplied with electric energy via the rectifier 1 and the inverter 3. The switching means interrupts the direct connection between the supply grid AC2 and the network AC3 to be protected. At the same time, electric energy is supplied to the energy store 2 via the rectifier 1 from the output of the rectifier 1.

When the supply of the network AC3 to be protected from the supply grid AC1 via the rectifier 1 and the inverter 3 is interrupted due to a malfunction of the inverter 3 and when the supply grid AC2 is simultaneously undisturbed, the direct connection between the supply grid AC2 and the network AC3 to be protected is established via the switching means 4. Power is then supplied by bypassing the rectifier 1 and the inverter 3.

Conversely, when the supply grid AC1 and the supply grid AC2 are disturbed and at least the energy store 2 and the inverter 3 are undisturbed, the switching means 4 is preferably open and the network to be protected is receives power via the inverter 3 from the energy store 2.

Lastly, when the supply grid AC1, the supply grid AC2 as well as the energy store 2 or the inverter 3 are disturbed, the supply of the network AC3 to be protected is interrupted.

So far, the UPS according to the invention corresponds to a conventional online UPS.

The UPS according to the invention is different from a conventional UPS, as described initially, due to a novel architecture of a controller, an auxiliary current supply and an acquisition of measurement values.

The novel controller is formed by a first control part 5 and a second control part 6. The control parts 5, 6 are formed by circuit arrangements arranged on circuit carriers. The circuit arrangements are preferably constructed identically and differ from one another only in their programming, wherein they can be programmed by selecting individual components by way of switch positions, jumpers or by selecting the outputs of the control parts.

The control parts 5, 6 are configured for controlling the rectifier 1, the inverter 3 and the switching means 4. The control parts 5, 6 are hereby connected via lines to all two of the components, the rectifier 1, the inverter 3 or the switching means 4.

The three components 1, 3, 4 or only two components of the UPS can be controlled simultaneously. However, alternatively only a single of the components 1, 3, 4 may be controlled.

By programming the control parts 5, 6, for example the first control part 5 may control at least the rectifier 1 when the control part 5 is undisturbed. Alternatively, the second control part 6 may control at least the inverter 3 when the control part 6 is undisturbed.

As soon as one of the two control parts 5, 6 fails, the other control part 6, 5 can assume the function of the failed control part 5, 6 with respect to the switching means 4.

To enable communication between the one control part 5 with the other control part 6, the two control parts 5, 6 are connected to one another via a bus, preferably via a CAN bus 7.

Electrical energy for operating the two control parts 5, 6 is supplied to the two control parts 5, 6 from an auxiliary current supply. The auxiliary current supply is formed by two means 8, 9 for supplying auxiliary current. The two means 8, 9 for supplying auxiliary current are constructed identically. They each have an output which provides the electrical energy required for operating the control parts 5, 6.

The means 8, 9 for providing auxiliary current obtain the electrical energy, depending on availability, from the supply grid AC1, the supply grid AC2, the network AC3 to be protected or the energy store 2. To this end, the two means 8, 9 for providing auxiliary current are connected via inputs and lines with the supply grid AC1, the supply grid AC2, the network AC3 to be protected, and the energy store 2.

The means 8, 9 for providing auxiliary current are configured to supply power simultaneously to the first control part 5 and the control part 6. The means 8, 9, however, are preferably configured by a hardware function or through suitable programming such that they each provide only half of the power that is simultaneously consumed by the two control parts 5, 6. The means 8, 9 for providing auxiliary current, when undisturbed, are then loaded only to half of the nominal power, which increases the service life of the means 8, 9 for supplying auxiliary current as compared to a higher load.

Lastly, the two control parts 5, 6 are connected to sensors 10 which are configured to measure electrical parameters at the input and/or the output of the rectifier 1 and/or of the inverter 3, at the energy store 2 or at the switching means 4, and to convert the electrical parameters into an electrical low-voltage signal. These low-voltage signals are supplied to the control parts 5, 6 via lines. The low-voltage signals are processed in the control parts 5, 6 to control the rectifier 1, the inverter 3, and/or the switching means 4 or to check the state of the rectifier 1, the energy store 2, the inverter 3, and/or the switching means 4 and to determine malfunctions.

The sensors 10 are partially arranged in pairs, wherein the sensors 10 of a pair measure the same electrical parameter. While one sensor 10 of a pair is associated with one control part 5, the other sensor 10 of a pair is connected to the other control part 6, so that the same electrical parameter is provided to both control parts 5, 6. The sensors therefore also have redundancy.

The sensors 10 are preferable constructed identically.

The invention claimed is:

1. A single uninterruptible power supply unit, comprising:
a rectifier (1),
an energy store (2) for storing electrical energy,
an inverter (3),
a switching means (4) and
a controller (5, 6),
wherein a rectifier input of the rectifier (1) is connected to a first supply grid (AC1), wherein the energy store (2) is connected to a rectifier output of the rectifier (1) and to an inverter input of the inverter (3),
wherein a network (AC3) to be protected or a load to be protected is connected to an inverter output of the inverter (3),
wherein the rectifier input or a second supply grid (AC2) is connected via the switching means (4) with the inverter output, and
wherein the rectifier (1), the inverter (2) and the switching, means (4) are controlled by the controller (5, 6), and
wherein the controller (5, 6) comprises two control parts (5, 6) which are constructed with redundancy, and the rectifier (1) and the switching means (4) or the inverter (3) and the switching means (4) are simultaneously controlled by the control parts (5, 6).

2. The unit according to claim 1, wherein the control parts (5,6) are identically constructed circuit arrangements.

3. The unit according to claim 1, wherein the control pans (5, 6) are programmed, configured or connected to the remaining via outputs, wherein a first control part (5) of the control parts (5, 6) is programmed, configured or connected to the remaining unit via outputs so that, when the first control part (5) is undisturbed, at least the rectifier (1) is controlled by the first control part (5), and wherein a second control part (6) of the control parts (5, 6) is programmed, configured or connected to the remaining unit via outputs so that, when the second control part (6) is undisturbed, at least the inverter (3) is controlled by the second control part (6).

4. The unit according to claim 3, wherein the control parts (5, 6) are programmed, configured or connected to the remaining unit via outputs such that, when the first control pan (5) is disturbed, the inverter (3) and the switching means (4) are controlled by the second control part (6), and when the second control part (6) is disturbed, the rectifier (1) and switching means (4) are controlled by the first control pan (5).

5. The unit according to claim 1, wherein the single uninterruptible power supply unit comprises a first auxiliary current supply (8) and a second auxiliary current supply (9), each of the first auxiliary current supply (8) and the second auxiliary current supply (9) having a first output and a second output, at which an auxiliary voltage is tapped, wherein the first output of each of the first auxiliary current supply (8) and the second auxiliary current supply (9) is connected to an input for supplying auxiliary current to the first control part (5) and the second output of each of the first, auxiliary current supply (8) and the second auxiliary current supply (9) is connected to an input for supplying auxiliary current to the second control part (6).

6. The unit according to claim 5, wherein the first auxiliary current supply (8) and the second auxiliary current supply (9) are identically constructed circuit arrangements.

7. The unit according to claim 5, wherein each of the first auxiliary current supply (8) and the second auxiliary current supply (9) has a first input connecting to the rectifier input, a second input connecting to the inverter output, and a third input connecting the energy store (2).

8. The unit according to claim 1, wherein the unit comprises sensors (10) for measuring voltages and/or currents, wherein each sensor (10) is connected via a sensor output of the sensor (10) to exactly one control part (5, 6) and that each sensor is configured to convert a parameter to be measured into a low-voltage signal.

9. The unit according to claim 8, wherein at least a portion of the sensors (10) are associated with one another in pairs, wherein the sensors (10) of a sensor pair are connected to contacts or lines of the unit for measuring the same electrical parameter, and wherein one sensor (10) of a sensor pair is connected to the first control part (5) and the other sensor (10) of a sensor pair is connected to the second control part (6).

10. The unit according to claim 8, wherein the sensors (10) are configured to measure the voltage at the rectifier input, at the rectifier output, at the energy store (2), at the inverter input, at the inverter output, at the side of the switching means facing the second supply grid (AC2) and/or at the side of the switching means (4) facing the network (AC3) to be protected or the load to be protected, 11. The unit according to claim 8, wherein the sensors (10) are identically constructed circuit arrangements.

12. The unit according to claim 1, wherein the control parts (5, 6) are connected to one another by a communication bus.

13. The unit according to claim 1, wherein the control parts (5, 6) are programmed, configured or connected via outputs to the remaining unit, such that when the first control part (5) is disturbed, the inverter (3), the rectifier (1) and the switching means (4) are controlled by the second. control part (6) and/or when the second control part (6) is disturbed, the inverter (3), the rectifier (1) and the switching means (4) is controlled by the first control part (5).

14. The unit according to claim 1, wherein the control parts are connected to one another via a communication bus.

15. The unit according to claim 12, wherein the communication bus is a CAN bus (8).

\* \* \* \* \*

UNITED STATES PATENT AND TRADEMARK OFFICE
CERTIFICATE OF CORRECTION

| | | |
|---|---|---|
| PATENT NO. | : 9,124,128 B2 | Page 1 of 1 |
| APPLICATION NO. | : 13/439669 | |
| DATED | : September 1, 2015 | |
| INVENTOR(S) | : Martin et al. | |

It is certified that error appears in the above-identified patent and that said Letters Patent is hereby corrected as shown below:

In the Claims:

Col. 6, claim 1, line 51, delete the "," at the end of the line.

Col. 6, claim 3, line 62, insert --unit-- following "remaining".

Col. 7, claim 4, lines 7 and 10, change "pan" to --part--.

Col. 7, claim 5, line 20, delete the ",".

Col. 8, claim 13, line 26, delete the ".".

Signed and Sealed this
Twelfth Day of January, 2016

Michelle K. Lee
*Director of the United States Patent and Trademark Office*